United States Patent
Sakagami

(10) Patent No.: US 10,295,055 B2
(45) Date of Patent: May 21, 2019

(54) COMPRESSION CONTROL DEVICE FOR CONTINUOUSLY VARIABLE TRANSMISSION

(71) Applicant: HONDA MOTOR CO., LTD., Tokyo (JP)

(72) Inventor: Kyohei Sakagami, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 110 days.

(21) Appl. No.: 15/517,248

(22) PCT Filed: Jul. 14, 2015

(86) PCT No.: PCT/JP2015/070176
§ 371 (c)(1),
(2) Date: Apr. 6, 2017

(87) PCT Pub. No.: WO2016/059842
PCT Pub. Date: Apr. 21, 2016

(65) Prior Publication Data
US 2017/0307077 A1    Oct. 26, 2017

(30) Foreign Application Priority Data
Oct. 15, 2014  (JP) .................. 2014-211053

(51) Int. Cl.
*F16H 61/662* (2006.01)
*F16H 9/18* (2006.01)
*F16H 59/14* (2006.01)

(52) U.S. Cl.
CPC ......... *F16H 61/66272* (2013.01); *F16H 9/18* (2013.01); *F16H 59/14* (2013.01); *F16H 2061/66277* (2013.01)

(58) Field of Classification Search
None
See application file for complete search history.

(56) References Cited

U.S. PATENT DOCUMENTS

| | | |
|---|---|---|
| 8,977,447 B2 | 3/2015 | Sakagami |
| 2008/0032858 A1 | 2/2008 | Frank et al. |

(Continued)

FOREIGN PATENT DOCUMENTS

| | | |
|---|---|---|
| CN | 102792063 A | 11/2012 |
| JP | 2004-293652 A | 10/2004 |

(Continued)

OTHER PUBLICATIONS

International Search Report dated Oct. 20, 2015, issued in counterpart application No. PCT/JP2015/070176,w/ English translation . (4 pages).

(Continued)

*Primary Examiner* — Timothy Hannon
(74) *Attorney, Agent, or Firm* — Westerman, Hattori, Daniels & Adrian, LLP

(57) ABSTRACT

A compression control device for a continuously variable transmission is provided in which the compression control device that controls the compression of either one of shaft elements of the continuously variable transmission calculates a slip state matrix from an amplitude ratio between a variable component of a rotational speed of the input shaft and a variable component of a rotational speed of the output shaft, a phase lag that is an indicator of difference in phase between a variable component of the rotational speed of the input shaft and a variable component of the rotational speed of the output shaft, and a gear ratio between the input shaft and the output shaft, estimates a power transmission state among the input shaft element, the output shaft element, and the power transmission element based on an eigenvalue sequence calculated from the slip state matrix, and controls compression.

4 Claims, 12 Drawing Sheets

(56) References Cited

U.S. PATENT DOCUMENTS

2010/0198467 A1    8/2010  Van Der Noll
2014/0172254 A1    6/2014  Sakagami et al.
2015/0088388 A1*  3/2015  Kanehara .......... F16H 61/66272
                                                               701/51

FOREIGN PATENT DOCUMENTS

| JP | 2006-2795 A | 1/2006 |
| JP | 2007-085396 A | 4/2007 |
| JP | 2009-243683 A | 10/2009 |
| JP | 2010-533269 A | 10/2010 |
| JP | 5246420 B2 | 7/2013 |
| WO | 2013/021732 A1 | 2/2013 |

OTHER PUBLICATIONS

Office Action dated Jun. 27, 2018, issued in counterpart Japanese application No. 2016-553989, with English Translation. (6 pages).
Office Action dated Jun. 5, 2018, issued in counterpart Chinese application No. 201580055127.6, with English Translation. (10 pages).

* cited by examiner (A) $\Omega/\omega_{bN}=0.5$, $\varepsilon_{DN}=0.5$ (B) $\Omega/\omega_{bN}=1.0$, $\varepsilon_{DN}=1.0$ (C) $\Omega/\omega_{bN}=2.0$, $\varepsilon_{DN}=0.5$ (D) $\Omega/\omega_{bN}=3.0$, $\varepsilon_{DN}=0.5$

COMPRESSION CONTROL DEVICE FOR CONTINUOUSLY VARIABLE TRANSMISSION

TECHNICAL FIELD

The present invention relates to a compression control device for a continuously variable transmission that includes an input shaft into which a driving force of a drive source is inputted, an input shaft element that is provided on the input shaft, an output shaft via which the driving force of the drive source is changed in speed and outputted, an output shaft element that is provided on the output shaft, a power transmission element that is in contact with each of the input and output shaft elements and transmits the driving force from the input shaft to the output shaft by virtue of friction in contacted portions thereof, and compression control means that controls the compression of either one of the shaft elements of the input and output shaft elements.

BACKGROUND ART

A belt type continuously variable transmission in which a metal belt is wound around a drive pulley provided on an input shaft and a driven pulley provided on an output shaft, and transmission is carried out by changing the groove width of the two pulleys using transmission oil pressure, wherein a $\mu$ gradient, which is the rate of change of the coefficient of friction relative to the slip velocity of the metal belt, is calculated, and when the $\mu$ gradient attains a predetermined threshold value or below it is determined that a large amount of slippage has occurred in the metal belt, is known from Patent Document 1 below.

Furthermore, an arrangement is known from Patent Document 2 below in which the power transmission efficiency of a belt type continuously variable transmission is enhanced by taking into consideration that the power transmission efficiency is closely related to a parameter called the torque ratio r, which is obtained by dividing the torque actually transmitted between the input shaft and the output shaft by the maximum torque that can be transmitted without causing slippage in the metal belt, and since the maximum power transmission efficiency is obtained in a state in which the torque ratio r=1, focusing attention on a difference in the amplitude or a difference in the phase of a variable component (variation in rotational speed or variation in torque) of the rotational state between the input shaft and the output shaft due to slippage of the metal belt, parameters such as a slip identifier IDslip and a phase lag $\Delta\phi$, which are indicators for the torque ratio r, are introduced, and the pulley thrust is controlled so that the slip identifier IDslip and the phase lag $\Delta\phi$ coincide with a slip identifier reference value IDslip' and a phase lag reference value $\Delta\phi'$ corresponding to the torque ratio r=1.

RELATED ART DOCUMENTS

Patent Documents

Patent Document 1: Japanese Patent Application Laid-open No. 2006-2795
Patent Document 2: Japanese Patent No. 5246420

SUMMARY OF THE INVENTION

Problems to be Solved by the Invention

Since the arrangement described in Patent Document 1 above does not take into account the stiffness of the metal belt, which functions as a spring during power transmission, not only is the precision with which slippage is determined degraded, but it is also necessary to detect a pulley thrust and an input torque in order to calculate the $\mu$ gradient, and there are the problems that a special sensor for detecting the input torque in particular is required and it is difficult to equip an actual vehicle with the device in terms of cost and durability.

Furthermore, the arrangement described in Patent Document 2 above can enhance the power transmission efficiency by controlling the pulley thrust so as to give a target torque ratio of 1, but in order to avoid the occurrence of serious slippage in the metal belt due to disturbances such as pulsations in the oil pressure that generates pulley thrust or the torque transmitted back from the driven wheel side to the belt type continuously variable transmission side or in order to avoid the occurrence of serious slippage even due to change in the coefficient of friction between the pulley and the metal belt resulting from changes over time such as abrasion of the V-face of the pulley or deterioration of lubricating oil, it is necessary to actually set the target torque ratio to be less than 1 while taking into consideration a predetermined safety factor, and there is the problem that the pulley thrust will become excessively large by an amount corresponding to the safety factor and the power transmission efficiency will be degraded.

The present invention has been accomplished in light of the above circumstances, and it is an object thereof to detect a slip state between a shaft element and a power transmission element of a continuously variable transmission with good precision, and suppress slippage of the power transmission element with the minimum required compression, thus improving the power transmission efficiency.

Means for Solving the Problems

In order to attain the above object, according to a first aspect of the present invention, there is provided a compression control device for a continuously variable transmission, comprising: an input shaft into which a driving force of a drive source is inputted, an input shaft element that is provided on the input shaft, an output shaft via which the driving force of the drive source is changed in speed and outputted, an output shaft element that is provided on the output shaft, a power transmission element that is in contact with each of the input and output shaft elements and transmits the driving force from the input shaft to the output shaft by virtue of friction in contacted portions thereof, and compression control means that controls the compression of either one of the shaft elements of the input and output shaft elements, wherein the compression control means calculates a slip state matrix from an amplitude ratio between a variable component of a rotational speed of the input shaft and a variable component of a rotational speed of the output shaft, a phase lag that is an indicator of difference in phase between a variable component of the rotational speed of the input shaft and a variable component of the rotational speed of the output shaft, and a gear ratio between the input shaft and the output shaft, estimates a power transmission state among the input shaft element, the output shaft element, and the power transmission element based on an eigenvalue sequence calculated from the slip state matrix, and controls compression based on the power transmission state.

Further, according to a second aspect of the present invention, in addition to the first aspect, the compression control means decreases compression so that an imaginary part of the eigenvalue of the slip state matrix is made to gradually approach 0, and increases compression when even one eigenvalue whose absolute value exceeds 1 is present among the eigenvalues.

Furthermore, according to a third aspect of the present invention, there is provided a compression control device for a continuously variable transmission, comprising: an input shaft into which a driving force of a drive source is inputted, an input shaft element that is provided on the input shaft, an output shaft via which the driving force of the drive source is changed in speed and outputted, an output shaft element that is provided on the output shaft, a power transmission element that is in contact with each of the input and output shaft elements and transmits the driving force from the input shaft to the output shaft by virtue of friction in contacted portions thereof, and compression control means that controls the compression of either one of the shaft elements of the input and output shaft elements, wherein the compression control means calculates a traction ratio from an amplitude ratio between a variable component of a rotational speed of the input shaft and a variable component of a rotational speed of the output shaft, a phase lag that is an indicator of difference in phase between a variable component of the rotational speed of the input shaft and a variable component of the rotational speed of the output shaft, and a gear ratio between the input shaft and the output shaft, and controls compression so that the traction ratio coincides with a target traction ratio.

Moreover, according to a fourth aspect of the present invention, in addition to the third aspect, the target traction ratio is less than 1.

It should be noted here that a drive pulley 13 of an embodiment corresponds to the input shaft element of the present invention, a driven pulley 14 of the embodiment corresponds to the output shaft element of the present invention, a metal belt 15 of the embodiment corresponds to the power transmission element of the present invention, an engine E of the embodiment corresponds to the drive source of the present invention, an electronic control unit U of the embodiment corresponds to the compression control means of the present invention, and the pulley thrust of the embodiment corresponds to the compression of the present invention.

Effects of the Invention

In accordance with the first aspect of the present invention, since the compression control means, which controls the compression of either one of the shaft elements of the continuously variable transmission, calculates a slip state matrix from the amplitude ratio between a variable component of the rotational speed of the input shaft and a variable component of the rotational speed of the output shaft, the phase lag that is an indicator of the difference in phase between a variable component of the rotational speed of the input shaft and a variable component of the rotational speed of the output shaft, and a gear ratio between the input shaft and the output shaft, estimates a power transmission state between the input shaft element, the output shaft element, and the power transmission element based on an eigenvalue sequence calculated from the slip state matrix, and controls compression based on the power transmission state, it is possible to determine the slip state of the power transmission element with good precision from the amplitude ratio, the phase lag, and the gear ratio, which can be measured without requiring a special sensor, thus enhancing the power transmission efficiency by controlling the compression in the vicinity of the frictional transmission limit with high precision.

Furthermore, in accordance with the second aspect of the present invention, since the compression control means decreases compression so that the imaginary part of the eigenvalue of the slip state matrix is made to gradually approach 0, and increases compression when even one eigenvalue whose absolute value exceeds 1 is present among the eigenvalues, not only is it possible to control the compression in the vicinity of the frictional transmission limit with high precision, but it is also possible to enhance the compression when macro slip occurs in the power transmission element, thus avoiding any damage to the continuously variable transmission.

Moreover, in accordance with the third aspect of the present invention, since the compression control means, which controls the compression of either one of the shaft elements of the continuously variable transmission, calculates a traction ratio from the amplitude ratio between a variable component of the rotational speed of the input shaft and a variable component of the rotational speed of the output shaft, the phase lag that is an indicator of the difference in phase between a variable component of the rotational speed of the input shaft and a variable component of the rotational speed of the output shaft, and a gear ratio between the input shaft and the output shaft, and controls compression so that the traction ratio coincides with a target traction ratio, it is possible to determine the slip state of the power transmission element with good precision from the amplitude ratio, the phase lag, and the gear ratio, which can be measured without requiring a special sensor, thus enhancing the power transmission efficiency by controlling the compression in the vicinity of the frictional transmission limit with high precision. Moreover, since the traction ratio denotes the resistance to slip of the power transmission element toward disturbance with the frictional transmission limit as a reference, even when the coefficient of friction changes due to a change over time such as wear of the shaft element and the power transmission element or deterioration of the hydraulic oil, it is possible to control the compression at an appropriate magnitude, thus reliably preventing the power transmission element from slipping.

Furthermore, in accordance with the fourth aspect of the present invention, since the target traction ratio is less than 1, even when an unexpectedly large disturbance occurs, the traction ratio does not reach 1, thus further reliably preventing the power transmission element from slipping.

EXPLANATION OF REFERENCE NUMERALS AND SYMBOLS

11 Input shaft
12 Output shaft
13 Drive pulley (input shaft element)
14 Driven pulley (output shaft element)
15 Metal belt (power transmission element)
{A} Slip state matrix
E Engine (drive source)
i Gear ratio
m Amplitude ratio
U Electronic control unit (compression control means)
$\phi_{p.DN}$ Phase lag
$\zeta_c<>/\zeta_{DN}<>$ Traction ratio

MODES FOR CARRYING OUT THE INVENTION

An embodiment of the present invention is explained below by reference to FIG. 1 to FIG. 13.

First Embodiment

Figure 1:
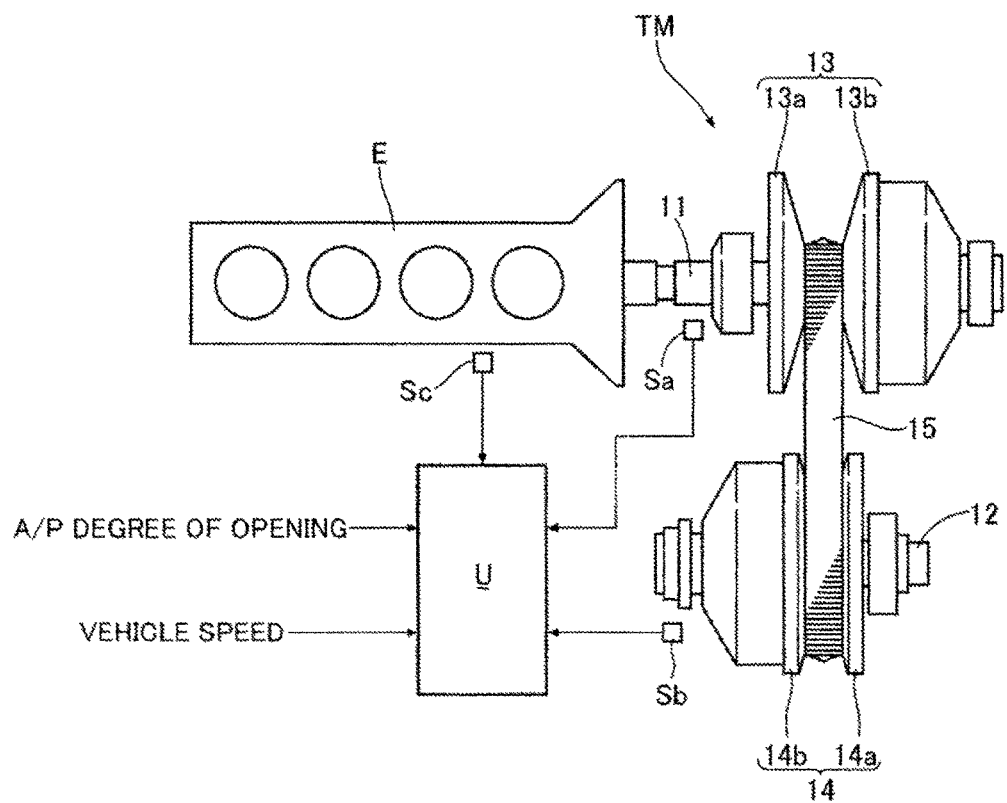
FIG. 1 is a view showing the overall structure of a belt type continuously variable transmission. (first embodiment)

First, as shown in FIG. 1, a belt type continuously variable transmission TM mounted on an automobile includes an input shaft 11 connected to an engine E, an output shaft 12 disposed in parallel to the input shaft 11, a drive pulley 13 provided on the input shaft 11, a driven pulley 14 provided on the output shaft 12, and an endless metal belt 15 wound around the drive pulley 13 and the driven pulley 14. The drive pulley 13 is formed from a fixed side pulley half 13a and a movable side pulley half 13b, and the movable side pulley half 13b is urged with pulley thrust in a direction in which it moves toward the fixed side pulley half 13a. Similarly, the driven pulley 14 is formed from a fixed side pulley half 14a and a movable side pulley half 14b, and the movable side pulley half 14b is urged with pulley thrust in a direction in which it moves toward the fixed side pulley half 14a. Therefore, controlling the pulley thrust acting on the movable side pulley half 13b of the drive pulley 13 and the pulley thrust acting on the movable side pulley half 14b of the driven pulley 14 and thereby increasing the groove width of one of the drive pulley 13 and the driven pulley 14 and decreasing the groove width of the other enables the gear ratio of the belt type continuously variable transmission TM to be freely changed.

Inputted into an electronic control unit U controlling the gear ratio of the belt type continuously variable transmission TM are the rotational speed of the input shaft 11 detected by an input shaft rotational speed sensor Sa, the rotational speed of the output shaft 12 detected by an output shaft rotational speed sensor Sb, and the rotational speed of an engine E detected by an engine rotational speed sensor Sc, as well as an accelerator position signal, a vehicle speed signal, etc. The electronic control unit U carries out control so as to change the pulley thrust in order to enhance the power transmission efficiency of the belt type continuously variable transmission TM as well as the usual gear ratio control by changing the pulley thrust of the belt type continuously variable transmission TM based on the accelerator position signal and the vehicle speed signal.

Figure 2:
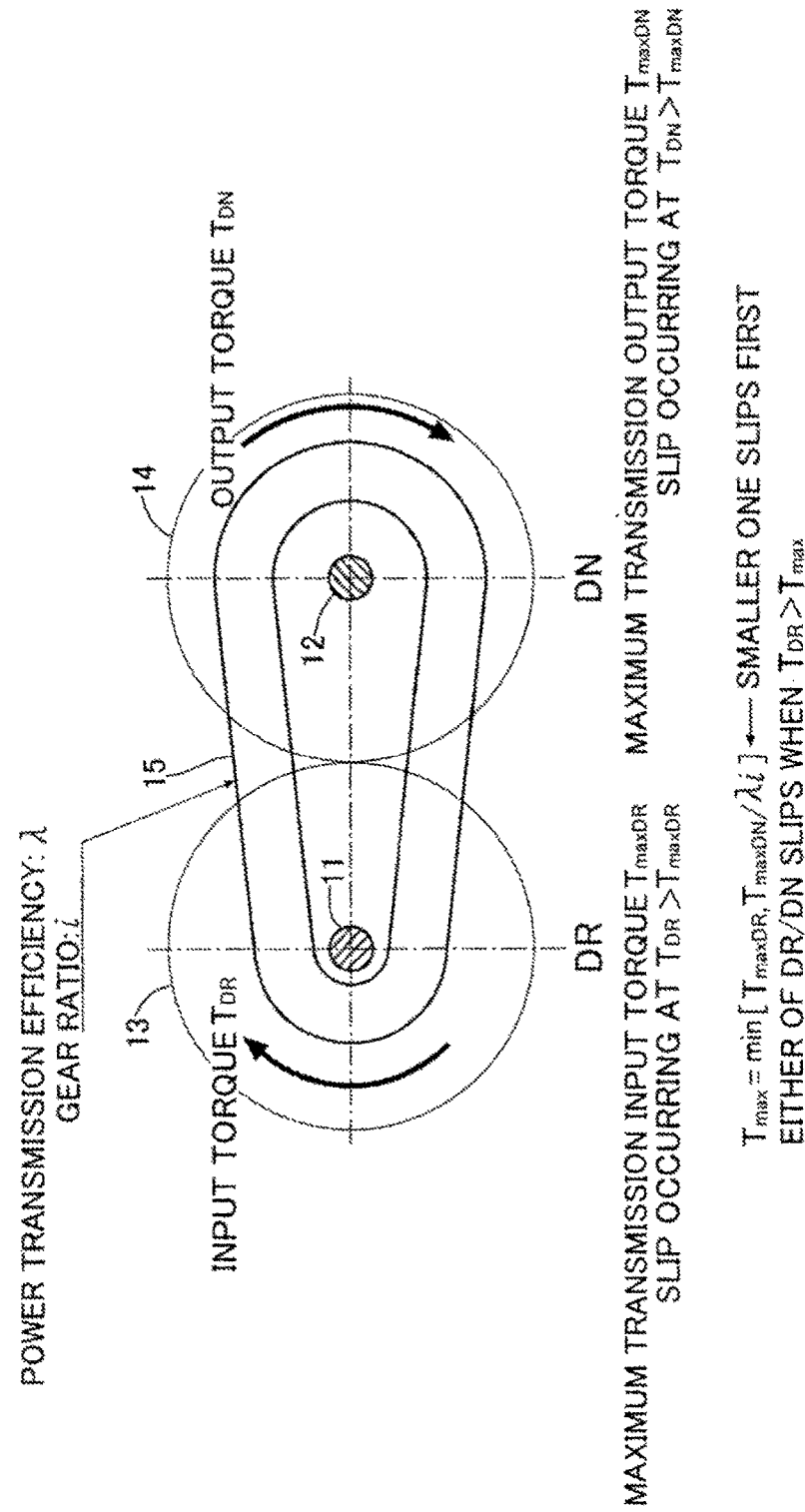
FIG. 2 is a diagram for explaining speed change control and thrust control of the belt type continuously variable transmission. (first embodiment)

As shown in FIG. 2, when the input torque of the belt type continuously variable transmission TM is defined as $T_{DR}$, the output torque is defined as $T_{DN}$, the maximum transmission input torque, that is, the input torque $T_{DR}$ at the instant when slippage occurs between the drive pulley 13 and the metal belt 15, is defined as $Tmax_{DR}$, the maximum transmission output torque, that is, the output torque $T_{DN}$ at the instant when slippage occurs between the driven pulley 14 and the metal belt 15, is defined as $Tmax_{DN}$, the power transmission efficiency is defined as $\lambda$, and the gear ratio is defined as i, the maximum transmission torque Tmax of the belt type continuously variable transmission TM is the smaller one of $Tmax_{DR}$ and $Tmax_{DN}/\lambda i$, and when $T_{DR}$>Tmax, either one of the drive pulley 13 and the driven pulley 14 slips.

Figure 3:
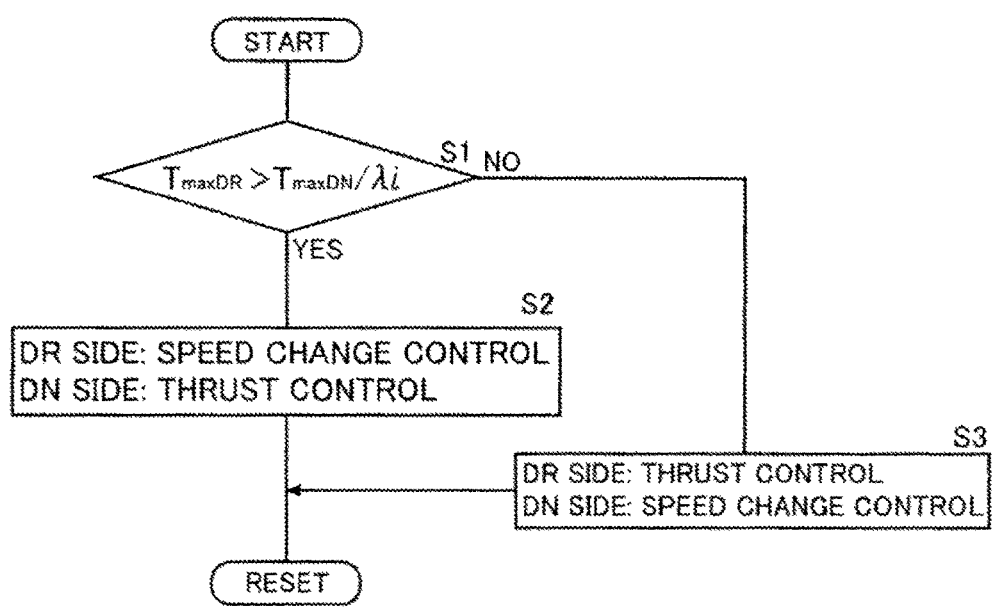
FIG. 3 is a flowchart for determining speed change control and thrust control of a pulley. (first embodiment)

As shown in the flowchart of FIG. 3, for example, when in step S1 $Tmax_{DR}$>$Tmax_{DN}/\lambda i$, slippage occurs in the driven pulley 14 at the instant when output torque $T_{DN}$>maximum transmission output torque $Tmax_{DN}$, and therefore in order to control the gear ratio of the belt type continuously variable transmission TM in step S2 the thrust of the drive pulley 13 is changed (speed change control), and in order to prevent the driven pulley 14 from slipping the thrust of the driven pulley 14 is controlled (thrust control).

On the other hand, when in step S1 $Tmax_{DR}\leq Tmax_{DN}/\lambda i$, at the instant when input torque $T_{DR}$>maximum transmission input torque $Tmax_{DR}$ slippage occurs in the drive pulley 13, and therefore in order to control the gear ratio of the belt type continuously variable transmission TM in step S3 the thrust of the driven pulley 14 is changed (speed change control), and in order to prevent the drive pulley 13 from slipping the thrust of the drive pulley 13 is controlled (thrust control).

The invention of the present application relates to thrust control in order to prevent slippage between the drive pulley 13 and the metal belt 15 as described above, or between the driven pulley 14 and the metal belt 15.

Figure 4:
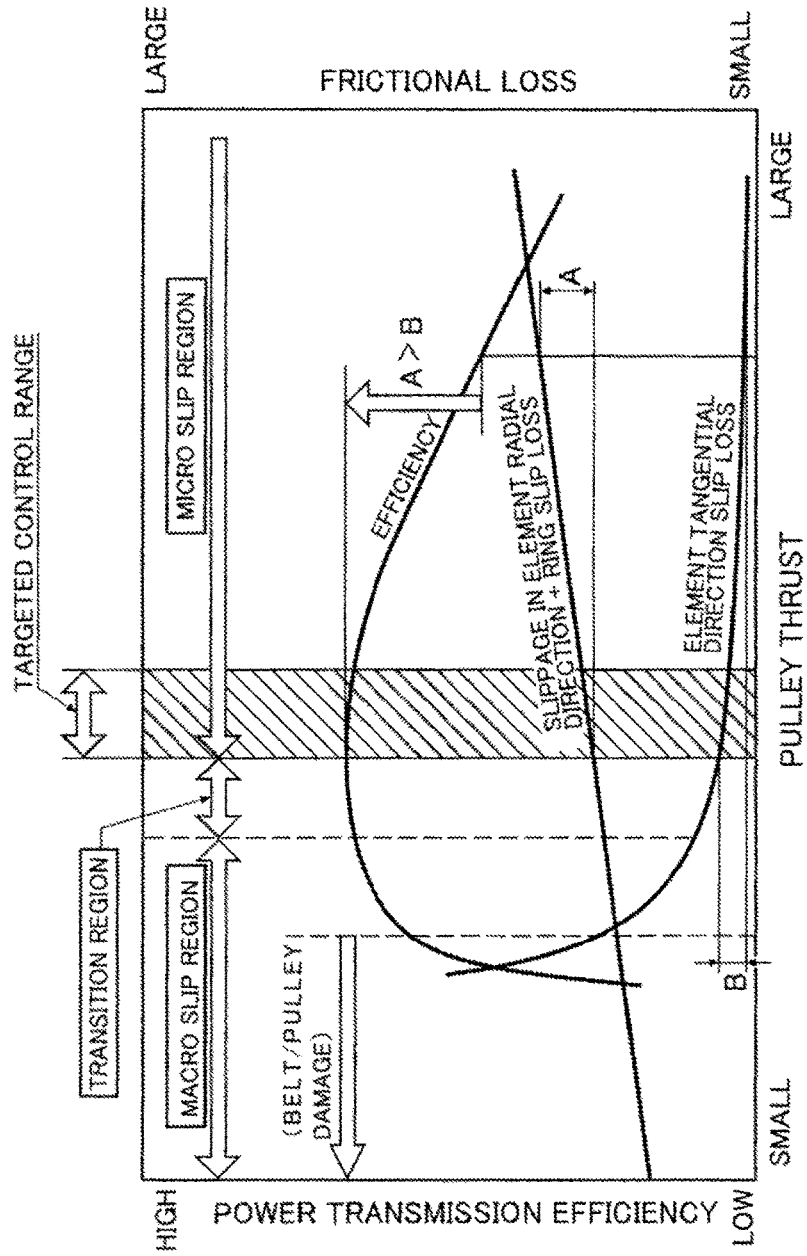
FIG. 4 is a graph showing the relationship between pulley thrust and power transmission efficiency. (first embodiment)

As one means for enhancing the power transmission efficiency of the belt type continuously variable transmission TM, lowering the pulley thrust that is applied to the pulley is known. FIG. 4 shows the relationship between power transmission efficiency and frictional loss with respect to pulley thrust; accompanying a decrease in the pulley thrust, there is a shift from a micro slip region in which slippage between the pulley and the metal belt is small, via a transition region, to a macro slip region in which slippage between the pulley and the metal belt is large. In the micro slip region the power transmission efficiency gradually increases in response to the pulley thrust decreasing, but in the transition region the power transmission efficiency starts decreasing, and in the macro slip region the power transmission efficiency decreases sharply.

The reason therefor is that the sum of the frictional loss due to slippage in the radial direction of a metal element of the metal belt and the frictional loss due to slippage of a metal ring decreases with a relatively large and constant rate of decrease A from the micro slip region to the macro slip region accompanying a decrease in the pulley thrust, but the frictional loss due to slippage in the tangential direction of the metal element increases with a relatively small and substantially constant rate of increase B (A>B) from the micro slip region to the transition region and sharply increases in the macro slip region.

In order to obtain the maximum power transmission efficiency, it is desirable to control the pulley thrust so that it is in the micro slip region immediately before the transition region, but if the pulley thrust is decreased excessively, it goes from the micro slip region and enters the macro slip region beyond the transition region, and there is a possibility that the metal belt will slip greatly against the pulley and be damaged. Therefore, in order to enhance the power transmission efficiency while ensuring the durability of the belt type continuously variable transmission TM, it is necessary to control the pulley thrust so that it is in the micro slip region immediately before the transition region with good precision.

From the viewpoint of an increase in slip velocity, the present invention defines a frictional transmission limit and constructs a method that can determine the margin of the current slip state with respect to the frictional transmission limit; if such the margin can be measured, it will be possible to realize pulley thrust control that can be put into actual use while taking into consideration the minimum safety factor with respect to disturbance.

<Basic Equation>

Figure 5:
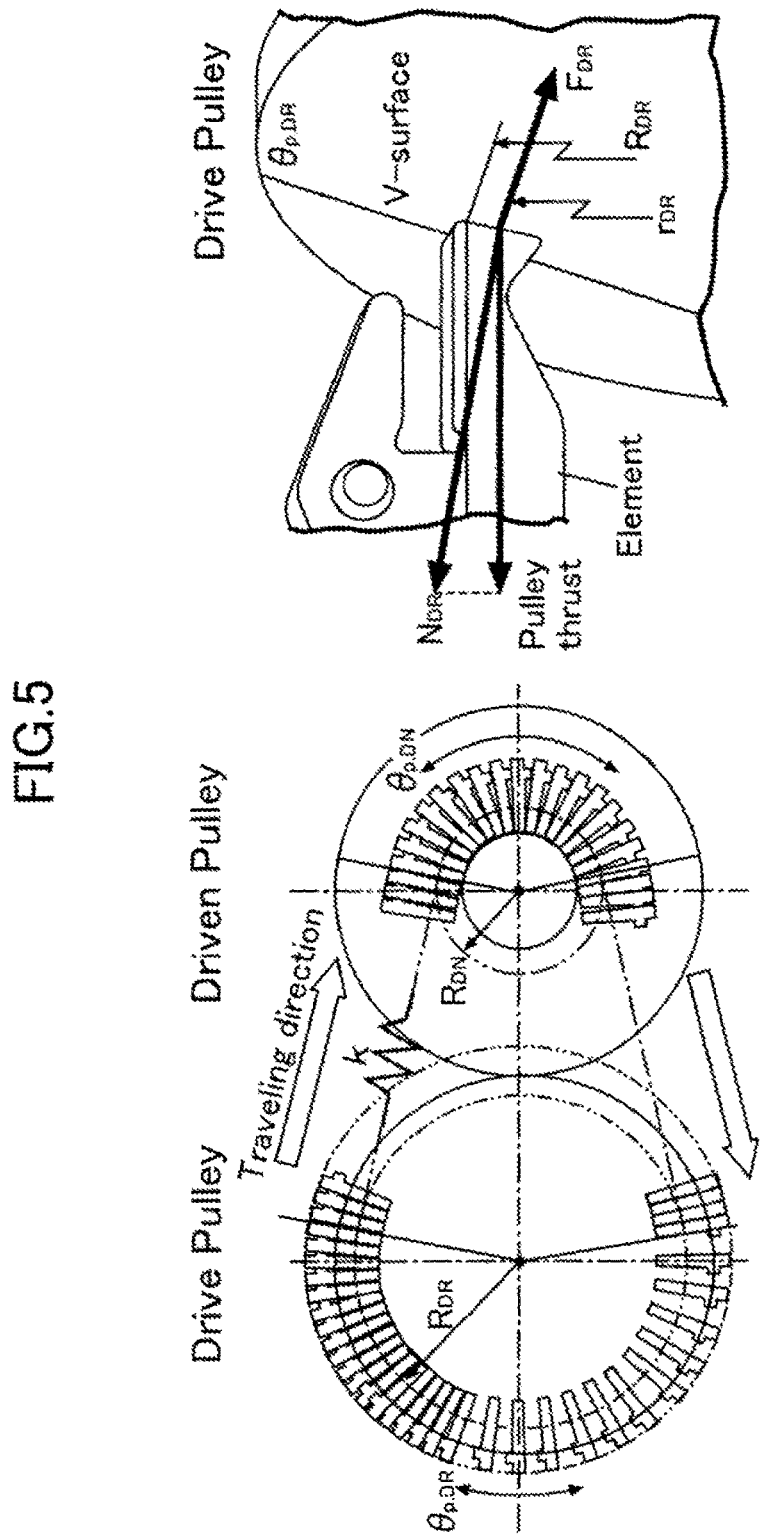
FIG. 5 is a diagram showing a simplified power transmission state model of the belt type continuously variable transmission. (first embodiment)
Figure 6:
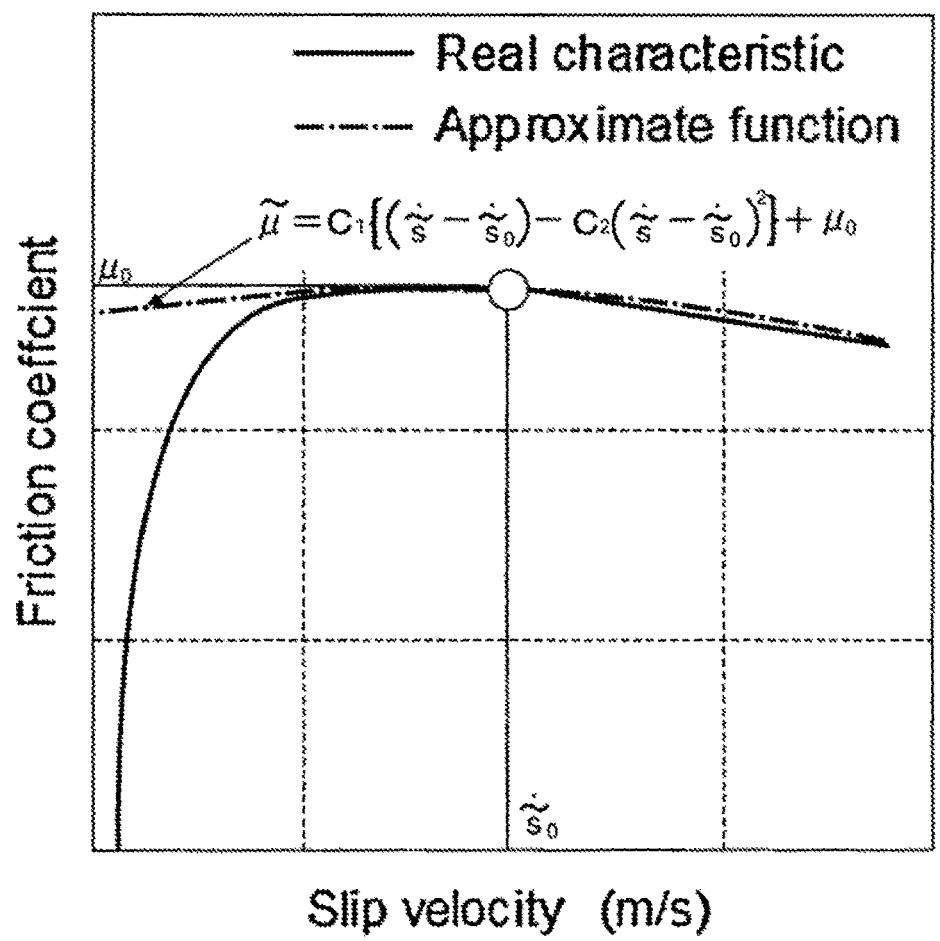
FIG. 6 is a graph showing frictional characteristics between the pulley and a metal belt. (first embodiment)

The belt type continuously variable transmission in an actual device is driven by an engine. In this arrangement, the input torque has torque variation due to in-cylinder pressure variation of the engine. It is therefore necessary to consider slip between the pulley and the metal belt as being dynamic. It is reported that when analyzing the dynamics of timing belt transmission, the longitudinal stiffness of the belt is treated as a spring element, and analyzing the longitudinal vibration of the metal belt enables rotational angle variation of the pulley to be calculated. It is known that, unlike a rubber belt or a chain, a metal belt mainly carries out power transmission by means of a compressive force between the metal elements. Therefore, a simple model as shown in FIG. 5 is considered in which the compression stiffness of the metal belt is represented by a one-dimensional spring element.

It is assumed that the load torque is acting on the drive pulley and the driven pulley and there is an equilibrium point $\{\theta_0\}$. From this equilibrium point rotational angle perturbation of the drive pulley and the driven pulley is defined as $\theta_{p.DR}$ and $\theta_{p.DN}$ respectively. When each group of metal elements wound around the drive pulley and the driven pulley is considered as one particle, and the rotational angle perturbation from the equilibrium point is similarly defined as $\theta_{b.DR}$ and $\theta_{b.DN}$, the equations of motion of the pulley and the metal belt are as follows.

[Eq. 1]

$$\begin{cases} f_1 = I_{p.DR}\ddot{\theta}_{p.DR} = -2F_{DR}r_{DR} \\ f_2 = I_{b.DR}\ddot{\theta}_{b.DR} = 2F_{DR}r_{DR} - kR_{DR}(R_{DR}\theta_{b.DR} - R_{DN}\theta_{b.DN}) \\ f_3 = I_{b.DN}\ddot{\theta}_{b.DN} = kR_{DN}(R_{DR}\theta_{b.DR} - R_{DN}\theta_{b.DN}) - 2F_{DN}r_{DN} \\ f_4 = I_{p.DN}\ddot{\theta}_{p.DN} = 2F_{DN}r_{DN} \end{cases} \quad (1)$$

Here, $I_p$ is the moment of inertia of the pulley, $I_b$ is the moment of inertia of a portion of the belt that is wound around the pulley, F is the frictional force acting between the pulley and the metal belt, k is the compression stiffness of the metal belt, R is the belt pitch radius, and r is the frictional effective radius. The subscripts DR and DN denote the drive side and the driven side respectively.

In the present specification and the attached drawings, the symbols in the equations and the notation in the text are sometimes different, the correspondence therebetween being shown in Table 1. Bold characters in the equations denote a vector or a matrix, and in the expression {*} in the text of the present specification, * denotes a vector or a matrix.

TABLE 1

| Notation of symbols | |
|---|---|
| Notation in equations | Notation in text |
| $\tilde{\mu}$ | $\mu<\cdot>$ |
| $\dot{\tilde{s}}$ | $s<\cdot>$ |
| $\dot{\tilde{s}}_0$ | $s_0<\cdot>$ |
| $\dot{x}_{b.DN}$ | $x_{b.DN}<\cdot>$ |
| $\dot{x}_{p.DN}$ | $x_{p.DN}<\cdot>$ |
| $\dot{x}$ | $x<\cdot>$ |
| $\zeta_{DN}$ | $\zeta_{DN}<\cdot>$ |
| $\zeta_c$ | $\zeta_c<\cdot>$ |

A frictional force acting between the pulley and the metal belt is expressed as the product of a coefficient of friction $\mu<\cdot>$ and a vertical drag N acting on the belt V-face.

[Eq. 2]

$$\begin{cases} F_{DR} = \tilde{\mu}_{DR}N_{DR} \\ F_{DN} = \tilde{\mu}_{DN}N_{DN} \end{cases} \quad (2)$$

The coefficient of friction $\mu<\cdot>$ is an average coefficient of friction and is defined by following equations.

[Eq. 3]

$$\begin{cases} \tilde{\mu}_{DR} = \frac{T_{DR}\cos\psi}{2Q_{DR}r_{DR}} \\ \tilde{\mu}_{DN} = \frac{T_{DN}\cos\psi}{2Q_{DN}r_{DN}} \end{cases} \quad (3)$$

T is the load torque of the pulley, Q is the pulley thrust, and $\Psi$ is ½ of the V angle.

Since the metal element and the metal ring are not restrained, individual metal elements in the pulley transmit power while producing micro slip. In this process, it is known that as the frictional transmission approaches saturation, the number of metal elements transmitting power in the pulley increases, and as a result the macroscopic slip velocity between the metal belt and the pulley increases.

When the average slip velocity between the pulley and the metal belt is defined as $s<\cdot>$, the coefficient of friction $\mu<\cdot>$ is expressed as a function of the average slip velocity $s<\cdot>$. The average slip velocity at the equilibrium point is expressed as a second-order approximation equation by Taylor expansion around $s_0<\cdot>$ (see FIG. 6).

[Eq. 4]

$$\begin{cases} \tilde{\mu}_{DR} = c_{1.DR}\{(\dot{\tilde{s}}_{DR} - \dot{\tilde{s}}_{0.DR}) - c_{2.DR}(\dot{\tilde{s}}_{DR} - \dot{\tilde{s}}_{0.DR})^2\} + \mu_{0.DR} \\ \tilde{\mu}_{DN} = c_{1.DN}\{(\dot{\tilde{s}}_{DN} - \dot{\tilde{s}}_{0.DN}) - c_{2.DN}(\dot{\tilde{s}}_{DN} - \dot{\tilde{s}}_{0.DN})^2\} + \mu_{0.DN} \\ \dot{\tilde{s}}_{DR} = R_{DR}(\dot{\theta}_{b.DR} - \dot{\theta}_{p.DR}) \\ \dot{\tilde{s}}_{DN} = R_{DN}(\dot{\theta}_{b.DN} - \dot{\theta}_{p.DN}) \end{cases} \quad (4)$$

From the definition of the equilibrium point, $\{f(\{\theta_0\})\}=0$ and $\{f\}^t=(f_1, f_2, f_3, f_4)$, and Formula (1) can therefore be expressed as follows.

[Eq. 5]

$$\begin{cases} I_{p.DR}\ddot{\theta}_{p.DR} = -2N_{DR}r_{DR}c_{1.DR} \times \\ \quad \{(R_{DR}\dot{\theta}_{p.DR} - R_{DR}\dot{\theta}_{b.DR}) - c_{2.DR}(R_{DR}\dot{\theta}_{p.DR} - R_{DR}\dot{\theta}_{b.DR})^2\} \\ I_{b.DR}\ddot{\theta}_{b.DR} = 2N_{DR}r_{DR}c_{1.DR} \times \\ \quad \{(R_{DR}\dot{\theta}_{p.DR} - R_{DR}\dot{\theta}_{b.DR}) - c_{2.DR}(R_{DR}\dot{\theta}_{p.DR} - R_{DR}\dot{\theta}_{b.DR})^2\} - \\ \quad kR_{DR}(R_{DR}\theta_{b.DR} - R_{DN}\theta_{b.DN}) \\ I_{b.DN}\ddot{\theta}_{b.DN} = kR(R_{DR}\theta_{b.DR} - R_{DN}\theta_{b.DN}) - \\ \quad 2N_{DN}r_{DN}c_{1.DN} \times \{(R_{DN}\dot{\theta}_{b.DN} - R_{DN}\dot{\theta}_{p.DN}) - \\ \quad c_{2.DN}(R_{DN}\dot{\theta}_{b.DN} - R_{DN}\dot{\theta}_{p.DN})^2\} \\ I_{p.DN}\ddot{\theta}_{p.DN} = 2N_{DN}r_{DN}c_{1.DN} \times \\ \quad \{(R_{DN}\dot{\theta}_{b.DN} - R_{DN}\dot{\theta}_{p.DN}) - c_{2.DN}(R_{DN}\dot{\theta}_{b.DN} - R_{DN}\dot{\theta}_{p.DN})^2\} \end{cases} \quad (5)$$

Movement of the pulley and the metal belt accompanying slipping is described by nonlinear simultaneous differential equations.

The key parameters of Formula (5) are listed in Table 2. In the present embodiment the feasibility of measuring key parameters is as defined in Table 2. In order to understand the limit value of the coefficient of friction $\mu^{<>}$ in particular, it is necessary to intentionally cause macro slip, but this can result in damage to the belt type continuously variable transmission, and unless the measurement itself is the purpose it is difficult to carry out measurement in an actual device.

TABLE 2

| Definition and properties of key parameters | |
| --- | --- |
| $I_{p.DR}/I_{p.DN}$ Drive/driven pulley moment of inertia | Known quantity |
| $I_{b.DR}/I_{b.DN}$ Moment of inertia of belt present in drive/driven pulley | Known quantity |
| $\theta_{p.DR}/\theta_{p.DN}$ Rotational angle of drive/driven pulley | Known quantity Easily determined by measuring rotational speed |
| $\theta_{b.DR}/\theta_{b.DN}$ Rotational angle of belt present in drive/driven pulley | Unknown quantity Can be measured using special sensor, but difficult to measure in actual device |
| $T_{DR}/T_{DN}$ Load torque of drive/driven pulley | Unknown quantity Can be measured using special sensor, but difficult to measure in actual device |

TABLE 2-continued

| Definition and properties of key parameters | |
| --- | --- |
| k Compressive stiffness of belt | Unknown quantity Greatly influenced by individual difference and change over time |
| $\tilde{\mu}_{DR}/\tilde{\mu}_{DN}$ Coefficient of friction between pulley and belt on drive/driven side | Unknown quantity Greatly influenced by individual difference and change over time |
| $N_{DR}/N_{DN}$ Belt pressing force on drive/driven side | Known quantity Determined from pulley oil pressure |
| $R_{DR}/R_{DN}$ Belt pitch radius on drive/driven side | Known quantity Determined from gear ratio |
| $r_{DR}/r_{DN}$ Frictional effective radius on drive/driven side | Known quantity Determined from gear ratio |

<Slip State>

In power transmission using the metal belt, micro slip gradually increases as the frictional transmission limit is approached, but it stops short of becoming macro slip. Because of this, in power transmission using the metal belt the frictional transmission limit cannot be clearly determined in view of the existence of the slip phenomenon as in a mode represented by Coulomb friction. Therefore, in order to predict the frictional transmission limit it is necessary to clearly define this, but in order to do so it is necessary to define the slip state in order to quantify the frictional transmission limit.

Since the rotational angle perturbation $\theta_{p.DR}$ of the drive pulley in Formula (5) is known, the rotational angle perturbation $\theta_{p.DR}$ of the drive pulley is considered as an input given to the system, and when conversion of variables is carried out Formula (5) is expressed as a nonautonomous system as shown below.

[Eq. 6]

$$\begin{cases} \ddot{x}_{b.DR} = 2v_{DR}\zeta_{DR}\omega_{DR} \\ \quad \{(\dot{x}_{p.DR} - \dot{x}_{b.DR}) - \varepsilon_{DR}(\dot{x}_{p.DR} - \dot{x}_{b.DR})^2\} - \\ \quad \omega_{DR}^2(x_{b.DR} - x_{b.DN}) \\ \ddot{x}_{b.DN} = \rho^2\omega_{DN}^2(x_{b.DR} - x_{b.DN}) - \\ \quad 2v_{DN}\rho^2\zeta_{DN}\omega_{DN} \\ \quad \{(\dot{x}_{b.DN} - \dot{x}_{p.DN}) - \varepsilon_{DN}(\dot{x}_{b.DN} - \dot{x}_{p.DN})^2\} \\ \ddot{x}_{p.DN} = 2v_{DN}\zeta_{DN}\omega_{DN} \\ \quad \{(\dot{x}_{b.DN} - \dot{x}_{p.DN}) - \varepsilon_{DN}(\dot{x}_{b.DN} - \dot{x}_{p.DN})^2\} \end{cases} \quad (6)$$

Here, $x_{p.DR} = \theta_{p.DR}, x_{b.DR} = \theta_{b.DR}$ $x_{b.DN} = i\theta_{b.DN}, x_{p.DN} = i\theta_{p.DN}$ $v_{DR} = r_{DR}/R_{DR}, v_{DN} = r_{DN}/R_{DN}$ $\omega_{DR} = R_{DR}\sqrt{k/I_{b.DR}}, \omega_{DN} = R_{DN}\sqrt{k/I_{p.DN}}$ $\zeta_{DR} = c_{1.DR}N_{DR}R_{DR}/\sqrt{I_{b.DR}k}$, $\zeta_{DN} = c_{1.DN}N_{DN}R_{DN}/\sqrt{I_{p.DN}k}$ $\varepsilon_{DR} = c_{2.DR}R_{DR}, \varepsilon_{DN} = c_{2.DN}R_{DR}$ $\rho = \sqrt{I_{p.DN}/I_{b.DN}}, i = R_{DN}/R_{DR}$ Formula (6) treats the slippage occurring between the drive pulley and the metal belt and the slippage between the driven pulley and the metal belt separately, but usually either one of the drive side or the driven side first reaches the frictional transmission limit, thus producing macro slip. That is, either one of the drive side and the driven side dominates the slippage between the pulley and the metal belt in the vicinity of the frictional transmission limit point, and this usually corresponds to the one having the smaller frictional effective radius.

Therefore, the slippage between the pulley that is not dominant and the metal belt is ignored, and the slippage is dealt with as follows.

1. When slippage between the drive pulley and the metal belt is dominant: $\theta_{p.DN} = \theta_{b.DN}$
2. When slippage between the driven pulley and the metal belt is dominant: $\theta_{p.DR} = \theta_{b.DR}$ In what follows the emphasis is on the case of an OD ratio (gear ratio i<1) in which there is a large effect on fuel consumption, and a case in which slippage between the driven pulley and the metal belt is dominant is considered.

Here, bearing in mind that $x_{p.DR}$ is a known input and the initial value of $X_{p.DN}$ is arbitrary, Formula (6) can be expressed using state variant $\{x\} = {}^t(x_{b.DN}, x_{b.DN}{<}{\cdot}{>}, x_{p.DN}{<}{\cdot}{>})$ as follows.

[Eq. 7]

$$\dot{x} = X(x,t) \quad (7)$$

If the operation of an actual device is considered, rotational vibration due to in-cylinder pressure variation of an engine is inputted into the drive pulley. When the input into the system is expressed as follows,

[Eq. 8]

$$\dot{x}_{p.DR} = \alpha_{p.DR} \cos \tau, \tau = \Omega t \quad (8)$$

a periodic solution $\{x{<}{\cdot}{>}\}$ of Formula (7) is expressed as follows by Fourier series expansion.

[Eq. 9]

$$\hat{x} = \frac{a^0}{2} + \sum_{n=1}^{\infty}(a^n \cos n\tau + b^n \sin n\tau) \quad (9)$$

If it is assumed that with respect to $\tau$ each of the coefficients $\{a^0\}$, $\{a^n\}$, and $\{b^n\}$ of Formula (9) can be considered to be constant during a period of $2\pi$, the average value of $\{x{<}{\cdot}{>}\}$ for a period of $2\pi$ is $\{a^0\}/2$. When a variation $\{\zeta\}$ from this average value $\{a^0\}/2$ is considered, the variation equation is expressed as follows.

[Eq. 10]

$$\dot{\xi} = A(a^0/2)\xi + X(a^0/2, t), A = \frac{\partial X(a^0/2, t)}{\partial x} \quad (10)$$

$\{A(\{a^0\}/2)\}$ is a Jacobian matrix,

[Eq. 11]

$$A = \begin{pmatrix} 0 & 1 & 0 \\ -\rho^2 \omega_{DN}^2 & -2\nu_{DN}\rho^2 \bar{\zeta}_{DN}\omega_{DN} & 2\nu_{DN}\rho^2 \bar{\zeta}_{DN}\omega_{DN} \\ 0 & 2\nu_{DN}\bar{\zeta}_{DN}\omega_{DN} & -2\nu_{DN}\bar{\zeta}_{DN}\omega_{DN} \end{pmatrix} \quad (11)$$

and

[Eq. 12]

$$\bar{\zeta}_{DN} = \zeta_{DN}(1 - 2\varepsilon_{DN}g(a^0/2)), g(x) = \dot{x}_{b.DN} - \dot{x}_{p.DN} \quad (12)$$

applies.

In the present embodiment a state expressed by Formula (10) in particular is called a slip state. Since the Jacobian matrix $\{A\}$ is a function of the average value $\{a^0\}/2$ and is dependent on the slip state, when Jacobian matrix $\{A(\{a^0\}/2)\}$ is known the slip state can be estimated. Such a Jacobian matrix (state matrix) $\{A(\{a^0\}/2)\}$ is in particular called a slip state matrix.

Since $\rho$, $\nu_{DN}$, and $\Omega$ are known parameters expressing operating conditions, and in Formula (12) $\zeta_{DN}{<}{\cdot}{>}$ includes a nonlinear term, the parameter that dominates the slip state matrix $\{A(\{a^0\}/2)\}$ is $(\omega_{DN}, \zeta_{DN}{<}{\cdot}{>})$. However, since $(\omega_{DN}, \zeta_{DN}{<}{\cdot}{>})$ cannot be measured, conversion to a parameter that can be measured becomes a consideration. That is, $\{A(\omega_{DN}, \zeta_{DN}{<}{\cdot}{>})\} = \{A(a, b)\}$ exists and (a, b) are measureable.

<Method for Estimating Slip State Matrix>

Since the rotational speed of the driven pulley can be measured, there are three unknown quantities, that is, $x_{b.DN}$, $\omega_{DN}$, and $\zeta_{DN}{<}{\cdot}{>}$, and solving Formula (10) can give $\omega_{DN}$ and $\zeta_{DN}{<}{\cdot}{>}$.

If the periodic solution of Formula (10) is assumed to be

[Eq. 13]

$$\xi_{b.DN} = a_{b.DN}\cos(\tau - \phi_{b.DN}),$$
$$\xi_{p.DN} = a_{p.DN}\cos(\tau - \phi_{p.DN}), t = \Omega t$$

then

[Eq. 14]

$$\xi = \left(\frac{a_{b.DN}}{\Omega}\sin(\tau - \phi_{b.DN}),\right.$$
$$\left. a_{b.DN}\cos(\tau - \phi_{b.DN}), a_{p.DN}\cos(\tau - \phi_{p.DN})\right)$$

which is substituted in Formula (10), and this is solved using the Galerkin method to thus give the following equations.

[Eq. 15]

$$\omega_{DN}(m, \phi_{p.DN}) = \frac{\Omega}{\rho}\sqrt{\frac{1+\rho^2}{1 - \frac{\cos\phi_{p.DN}}{m}}} \quad (13)$$

[Eq. 16]

$$\bar{\zeta}_{DN}(m, \omega_{DN}) = \frac{\frac{\Omega}{\omega_{DN}}\left\{1 - \frac{1}{\rho^2}\left(\frac{\Omega}{\omega_{DN}}\right)^2\right\}}{2\nu_{DN}\sqrt{\frac{1}{m^2} - \left\{1 - \left(\frac{\Omega}{\omega_{DN}}\right)^2\left(\frac{1}{\rho^2} + 1\right)\right\}^2}} \quad (14)$$

$$= \bar{\zeta}_{DN}(m, \phi_{p.DN})$$

Here, $m=a_{p.DN}/a_{p.DR}$. Since the rotational speed of the drive pulley and the driven pulley can be measured, an amplitude ratio m and a phase lag $\phi_{p.DN}$ of the driven pulley rotational speed with respect to the drive pulley rotational speed can also be calculated. It is necessary to refer to a specific perturbation when calculating the amplitude ratio m and the phase lag $\phi_{p.DN}$, and the in-cylinder pressure variation of the engine can be used for this. That is, $\omega_{DN}$ and $\zeta_{DN}<\ >$ can be determined by calculating the amplitude ratio m and the phase lag $\phi_{p.DN}$ with the engine ignition frequency as ω, and the slip state matrix can be expressed with $\{A(m, \phi_{p.DN})\}$.

<Test Method>

Figure 7:
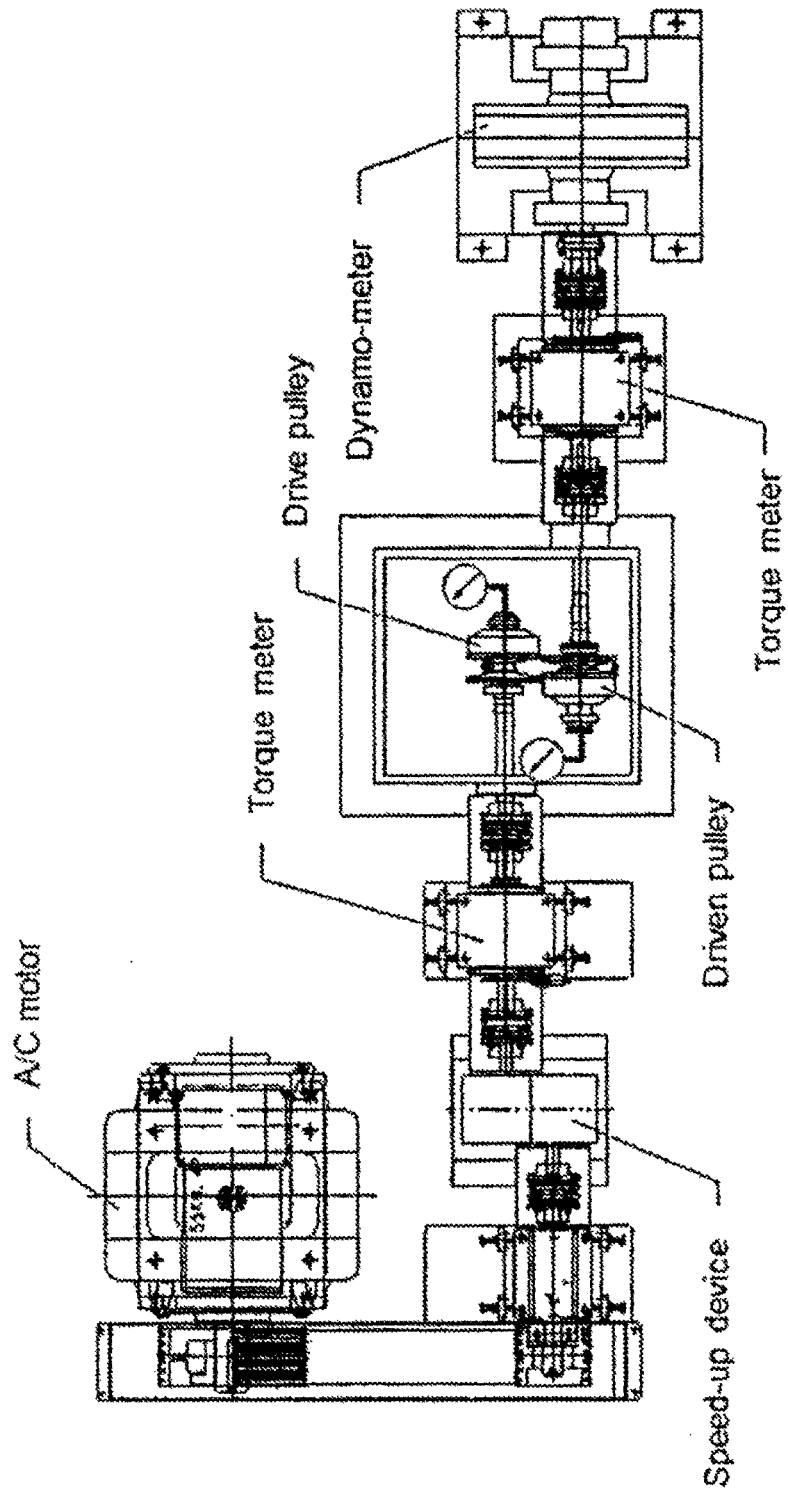
FIG. 7 is a schematic drawing of a test device. (first embodiment)

A method of estimating the slip state matrix $\{A(m, \phi_{p.DN})\}$ by substituting $(m, \phi_{p.DN})$ for the dominant parameter $(\omega_{DN}, \zeta_{DN}<\ >)$ of the slip state matrix $\{A\}$ is explained above. In order to prove the certainty of this method, a test with an actual device was carried out, and parameters obtained from the above method and parameters measured by the test were compared. FIG. 7 shows a test device. Power from an A/C motor was inputted to the drive pulley and transmitted to the driven pulley via the metal belt. Simulated engine torque disturbance was inputted into the drive pulley. A dynamometer gave the load torque to the driven pulley. Oil pressure was supplied to piston chambers of the drive pulley and the driven pulley, thus generating an axial thrust. Adding this oil pressure and a centrifugal oil pressure generated by rotation of the pulley gave the pulley thrust. There is the relationship shown below between the pulley thrust Q and the metal belt pressing load N of Formula (2).

[Eq. 17]

$$N = \frac{Q}{\cos\psi} \quad (15)$$

Here, Ψ is ½ of the V angle, and in the present embodiment a pulley and a metal belt having Ψ=11 deg were used.

<Measurement of $\omega_{DN}$>

In Formula (13) when $\phi_{p.DN}=\pi/2$, m>0, and the following is obtained.

[Eq. 18]

$$\frac{\Omega}{\omega_{DN}}\bigg|_{\phi_{p.DN}=\frac{\pi}{2}} = \frac{1}{\sqrt{1+\frac{1}{\rho^2}}} \quad (16)$$

Usually, the moment of inertia of the pulley is sufficiently smaller than the moment of inertia of the metal belt, and since $1/\rho^2 \ll 1$, the following is obtained.

[Eq. 19]

$$\omega_{DN}\bigg|_{\phi_{p.DN}=\frac{\pi}{2}} \approx \Omega \quad (17)$$

Therefore, the excitation frequency Ψ was changed, and the excitation frequency Ψ when the phase lag $\phi_{p.DN}=\pi/2$ was defined as the measured value for $\omega_{DN}$. While the excitation frequency Ψ was being changed, the gear ratio, the load torque, and the pulley thrust were made constant.

The same measurement was carried out under four levels of conditions where the pulley thrust was different. The test conditions are shown in Table 3.

TABLE 3

| Test conditions | |
| --- | --- |
| Speed ratio | 0.5 |
| Drive pulley torque | 50 Nm |
| Driven pulley thrust | 3661, 4061, 4561, 5203N |

<Measurement of $\zeta_{DN}<\ >$>

$\zeta_{DN}<\ >$ is a dimensionless quantity and cannot be measured directly, and it is necessary to determine it by measuring an actual dimensional parameter and calculating it therefrom. From the definition of $\zeta_{DN}$ and Formula (12), the following is obtained.

[Eq. 20]

$$\bar{\zeta}_{DN} = \frac{N_{DN} R_{DN}^2}{\omega_{DN} I_{p.DN}} \cdot \frac{d\bar{\mu}_{DN}}{d\bar{s}_{DN}} \quad (18)$$

In order to determine $\zeta_{DN}<\ >$ from Formula (18), it is necessary to measure the slip velocity between the drive pulley and the metal belt. A gear ratio that can be determined geometrically was determined by measuring the pulley stroke. The slip velocity can be evaluated from the difference between the geometrical gear ratio and an apparent gear ratio expressed as a rotational speed ratio between the drive pulley and the driven pulley.

<Estimation of Slip State Matrix>

Figure 8:
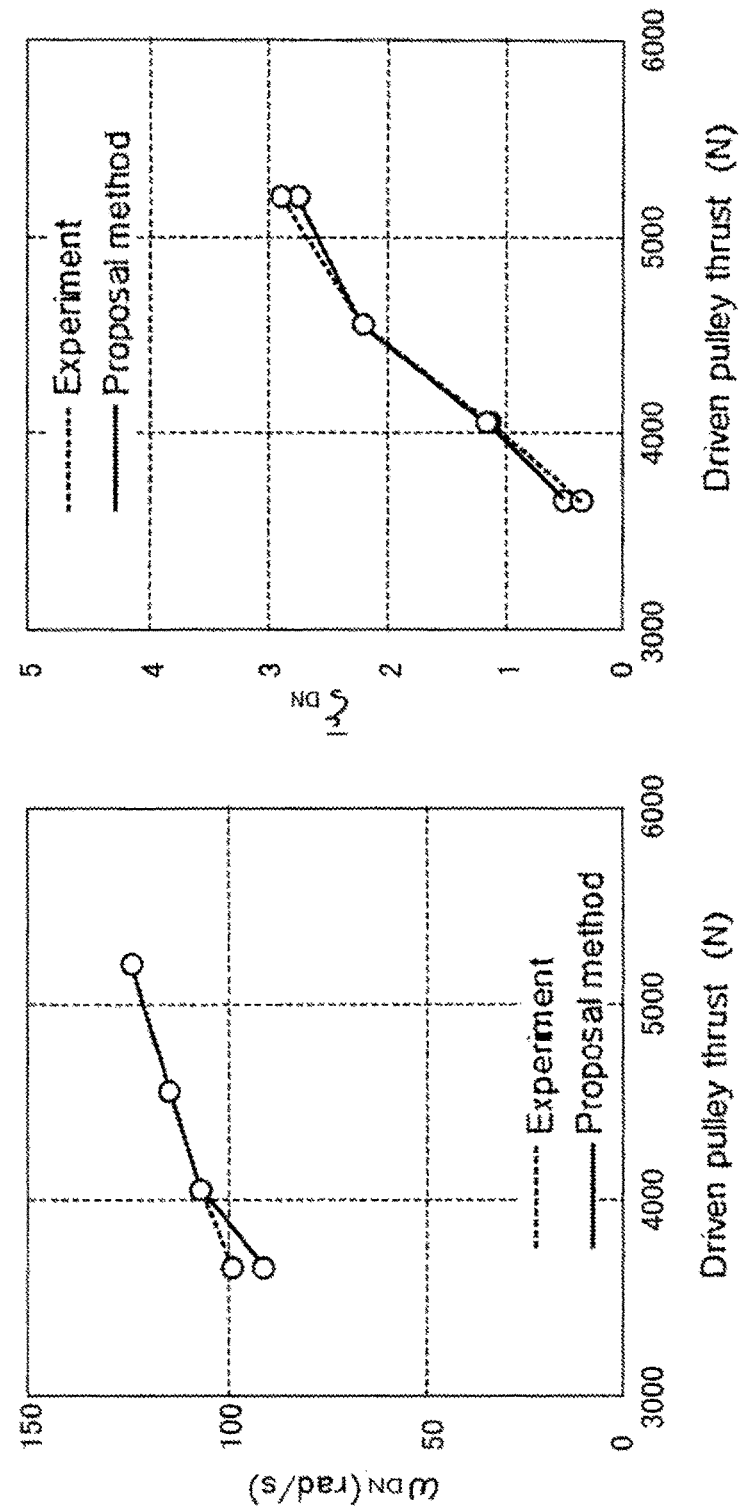
FIG. 8 is a graph showing the actual value and the estimated value of $\omega_{DN}$ and $\zeta_{DN}<>$ (gear ratio i=0.5). (first embodiment)

First, when estimating the slip state matrix $\{A(m, \phi_{p.DN})\}$, the effectiveness of the method of the present embodiment was confirmed. FIG. 8 shows the result of measurement of $\omega_{DN}$ and $\zeta_{DN}<\ >$ and an estimated value estimated by the present method using rotational variation. FIG. 8 showed good agreement between the measured value and the estimated value, and the effectiveness of the proposed method could be confirmed.

Accompanying a reduction in the pulley thrust, that is, accompanying it approaching the frictional transmission limit, both $\omega_{DN}$ and $\zeta_{DN}<\ >$ showed a tendency to decrease. It is surmised that the reason why $\omega_{DN}$ changes is that since $R_{DN}$ and $I_{p.DN}$ are constant the compression stiffness k changes. Due to the pulley thrust being reduced the metal ring tension also decreases. In the belt chord part, since the metal ring tension opposes a buckling load due to the metal element compression force, a decrease in the metal ring tension leads to an increase in the lateral displacement in the belt chord part. Therefore, it is surmised that $\omega_{DN}$ decreases because the apparent compression stiffness k decreases accompanying a decrease in the metal ring tension.

From the definition of $\zeta_{DN}<\ >$, the following is obtained.

[Eq. 21]

$$\bar{\zeta}_{DN} = \sqrt{\frac{1}{M_{p.DN}}} \cdot \frac{F'_{frie}}{\sqrt{k}} \quad (19)$$

$$M_{p.DN} = \frac{I_{p.DN}}{R_{DN}^2}, \quad F'_{frie} = N_{DN}\frac{d\bar{\mu}_{DN}}{d\bar{s}_{DN}}$$

$M_{p.DN}$ is the mass in the belt translational direction of the driven pulley. Since the friction gradient $F'_{fric}$ decreases as it approaches the frictional transmission limit, $\zeta_{DN}\langle\rangle$ decreases accompanying a reduction in the pulley thrust. The compression stiffness k denotes a restoring force gradient acting on the metal belt with respect to an input. From Formula (19) $\zeta_{DN}\langle\rangle$ correlates with the magnitude of the friction gradient $F'_{fric}$ with respect to the restoring force gradient acting on the metal belt.

<Stability of Slip State>

In order to estimate the slip state matrix $\{A(m, \phi_{p.DN})\}$ using the amplitude ratio m and the phase lag $\phi_{p.DN}$, it is necessary for the periodic solution $\{x\langle\rangle\}$ of Formula (10) to be stable in at least the frictional transmission region that is used in practice. The stability with respect to mutual shift between vibrational modes can be determined by obtaining a characteristic index or a characteristic multiplier. Considering a micro variation η with respect to the periodic solution $\{x\langle\rangle\}$ of Formula (6), a variational equation is given by the following equation.

[Eq. 22]

$$\dot{\eta} = A(t)\eta, \quad A = \frac{\partial X(\hat{x}, t)}{\partial x} \quad (20)$$

From Floquet's theorem, Formula (20) has a basic solution $\{\phi_j(\tau)\}$ of the following form.

[Eq. 23]

$$\phi_j(\tau) = e^{\mu_j \tau} p_j(\tau), \quad p_j(\tau+2\pi) = p_j(\tau)$$

$$\phi_j(\tau+2\pi) = \sigma_j \phi_j(\tau) \quad (21)$$

Here, $\mu_j$ is a characteristic index and $\sigma_j$ is a characteristic multiplier. Since the characteristic index $\mu_j$ and the characteristic multiplier $\sigma_j$ are transformable into each other, in the present embodiment examination of stability was carried out using the characteristic multiplier $\sigma_j$.

Figure 9:
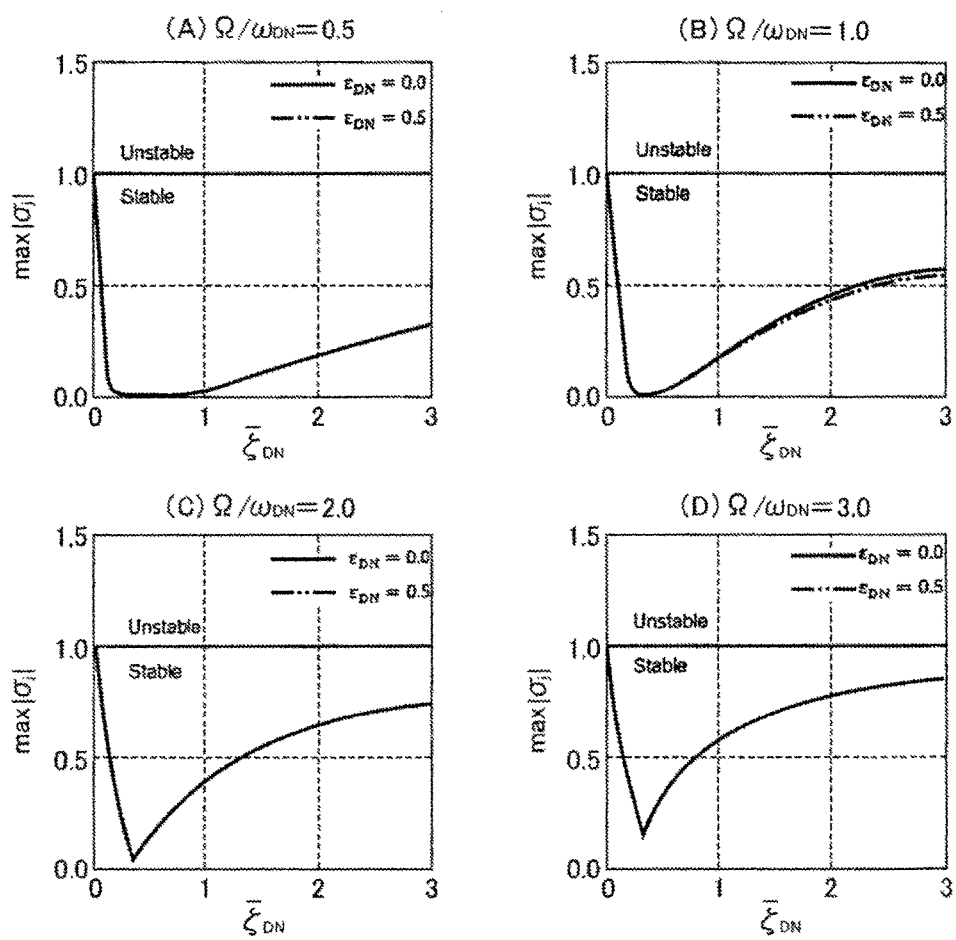
FIG. 9 is a graph showing safety determination of a slip state using a characteristic multiplier ($a_{p.DN}$=0.3 rad/s). (first embodiment)

In the present embodiment attention is focused on the OD ratio, which is often used, and parameter ranges that can actually be used in a belt type continuously variable transmission are assumed as listed in Table 4. The results of calculating the characteristic multiplier σj for the parameter ranges of Table 4 are shown in FIG. 9. Among the characteristic multipliers $\sigma_j$ obtained, only the value whose $|\sigma_j|$ is a maximum is shown.

TABLE 4

| Parameter range set from application conditions (speed ratio = 0.5) | |
|---|---|
| $\Omega/\omega_{DN}$ | 0~3 |
| ν | 0.9 |
| ρ | 25 |
| $\zeta_{DN}$ | 0~3 |
| $\alpha_{p.DR}$ | 0~0.3 rad/s |
| $\varepsilon_{DN}$ | 0~0.5 |

From FIG. 9 for $\zeta_{DN}\langle\rangle \geq 0$, since $|\sigma_j|<1$ for all characteristic multipliers $\sigma_j$, the periodic solution $\{x\langle\rangle\}$ is asymptotically stable. From Formula (19) it is a case in which the frictional force gradient $F'_{fric}$ is negative that $\zeta_{DN}\langle\rangle <0$ is satisfied, and it is self-evident that a solution of this case is unstable both globally and locally. Physically, a case of $\zeta_{DN}\langle\rangle <0$ corresponds to a state in which all of the metal elements wound around the pulley are uniformly experiencing slippage (macro slip).

Therefore, at least under application conditions, as long as no macro slip occurs, if (m, $\phi_{p.DN}$) is known it is possible to uniquely estimate the slip state matrix {A}. This is not the case when macro slip occurs, but when macro slip occurs, since m→0, it is possible to determine at least if macro slip has occurred. Since macro slip should be avoided, it is not important to know the slip state when macro slip is occurring, and it is sufficient in practice if the occurrence of macro slip can be determined.

Furthermore, from FIG. 9 $|\sigma_j|$ is a minimum in the vicinity of $\zeta_{DN}\langle\rangle =0.3$, and it is suggested that at this point there is a change in the slip state.

Figure 10:
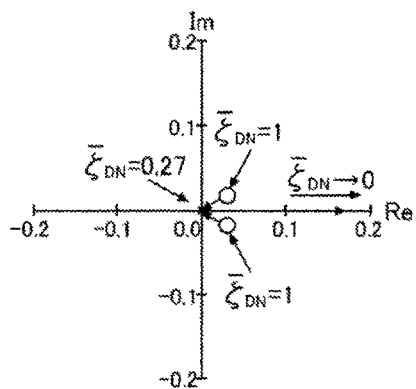
FIG. 10 is a graph showing the trajectory of the characteristic multiplier according to change in $\zeta_{DN}<>$ ($a_{p.DR}$=0.3 rad/s). (first embodiment)
Figure 10:
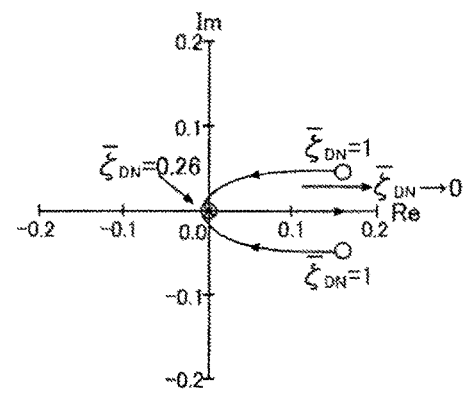
Figure 10:
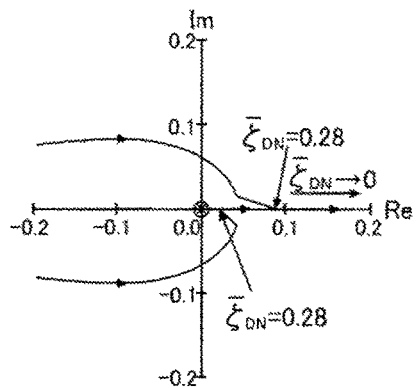
Figure 10:
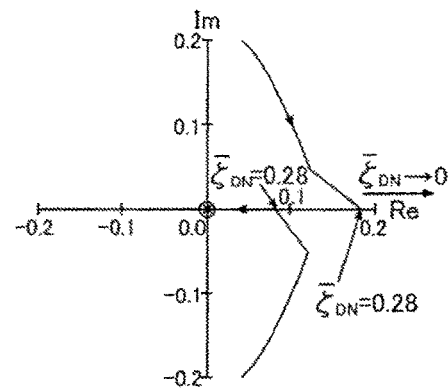

The trajectory of $\sigma_j$ when $\zeta_{DN}\langle\rangle \to 0$ is shown in FIG. 10. It can be seen from FIG. 10 that in a region in which $\zeta_{DN}\langle\rangle$ is smaller than about 0.3, every $\sigma_j$ moves the real axis. This means that when displacement of the solution trajectory occurs with respect to the periodic solution $\{x\langle\rangle\}$ the variation η does not produce perturbation, and it can be perceived that convergence to the periodic solution $\{x\langle\rangle\}$ becomes blunted. Since the frictional transmission limit referred to here can be considered as a state in which the response of the frictional force to a change in the restoring force acting on the metal belt is delayed, this slip state is defined as the frictional transmission limit. In this process all eigenvalues (characteristic roots) of the slip state matrix {A} are real roots.

<Prediction of Frictional Transmission Limit>

From the results above, the requirement for the slip state to be within the frictional transmission limit is that the slip state matrixes {A} has at least one imaginary root. Given a linear approximation of Formula (10), the requirement for the slip state matrix {A} to have an imaginary root is that the following relationship is satisfied.

[Eq. 24]

$$\bar{\zeta}_{DN} > \bar{\zeta}_c \quad (22)$$

$$\bar{\zeta}_c = \frac{\rho}{v_{DN}}\left[\frac{\rho^4 + 20\rho^2 - 8 + \rho(\rho^2-8)^{\frac{3}{2}}}{32(\rho^2+1)^3}\right]^{\frac{1}{2}}$$

From Formula (20) the critical value $\zeta_c\langle\rangle$ is a function of $v_{DN}$ and ρ and depends only on the speed ratio. Therefore, the current situation of the slip state approaching the frictional transmission limit can be expressed using $\zeta_{DN}\langle\rangle$ as an index without determining the slip state matrix {A}. Here, $\zeta_c\langle\rangle/\zeta_{DN}\langle\rangle$ is defined as a traction ratio (traction ratio).

Figure 11:
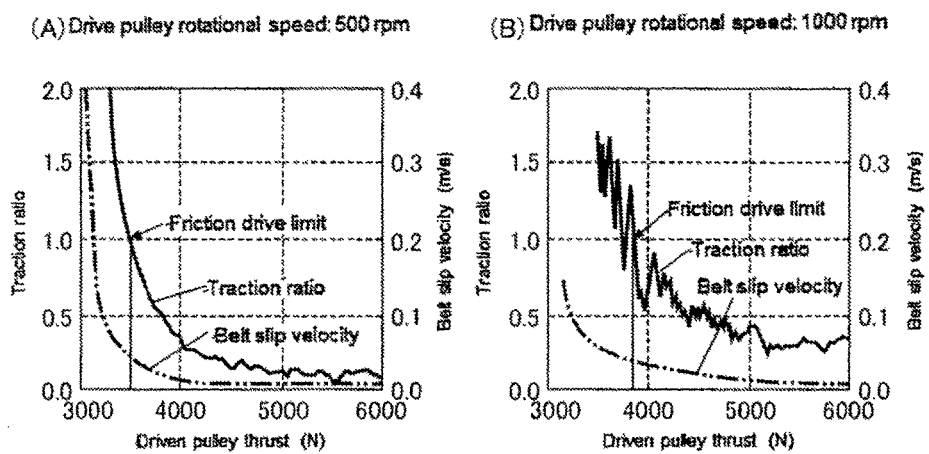
FIG. 11 is a graph showing the relationship between traction ratio and belt slip velocity (gear ratio i=0.5, drive pulley torque $T_{DR}$=50 Nm). (first embodiment)
Figure 12:
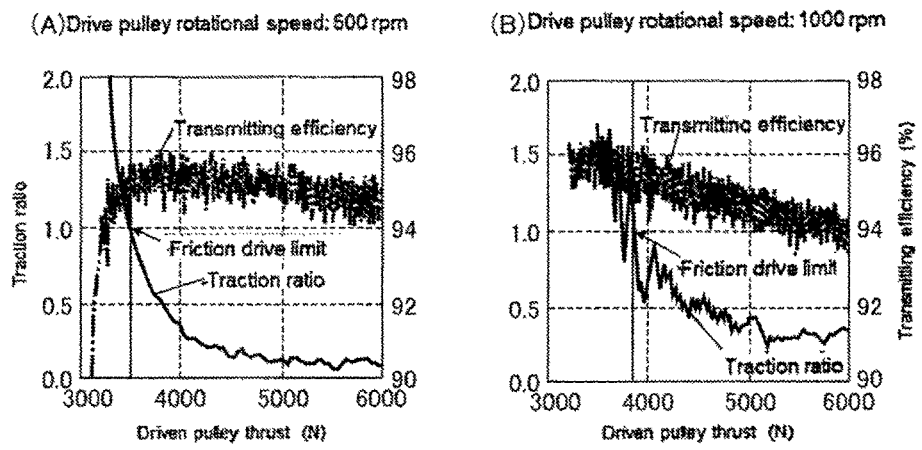
FIG. 12 is a graph showing the relationship between traction ratio and power transmission efficiency (gear ratio i=0.5, drive pulley torque $T_{DR}$=50 Nm). (first embodiment)

FIG. 11 shows the relationship between the traction ratio and the slip velocity and FIG. 12 shows the relationship between the traction ratio and the power transmission efficiency. It can be confirmed from FIG. 11 that when the traction ratio $\zeta_c\langle\rangle/\zeta_{DN}\langle\rangle$ is 1 the slip velocity between the pulley and the metal belt increases steeply. Furthermore, it can be confirmed from FIG. 12 that when the traction ratio $\zeta_c\langle\rangle/\zeta_{DN}\langle\rangle$ is 1 the power transmission efficiency is substantially a maximum.

Therefore, the definition of the frictional power limit focusing on the eigenvalue of the slip state matrix {A} is appropriate, and it can be confirmed that the frictional power limit can be predicted by calculating the traction ratio from rotational variation of the drive pulley and the driven pulley.

As described above, when rotational variation of the drive pulley is transmitted to the driven pulley via the metal belt, the rotational variation transmitted to the driven pulley decays as the frictional force approaches the saturation state. In the present embodiment, the drive pulley and the driven pulley are considered as a one-dimensional vibrating system in which they are connected via an elastic body, and the slip state of the metal belt is indexed as the slip state matrix {A} by focusing on the amplitude ratio m and the phase lag $\phi_{p.DN}$, which represent change in rotational variation. As characteristics of the slip state matrix {A}, the following results can be obtained.

1. When all of the eigenvalues of the slip state matrix {A} are real roots, the slip velocity between the pulley and the metal belt increases steeply.
2. If among the eigenvalues of the slip state matrix {A} there is even one root whose absolute value is 1 or greater, the slip state is in a macro slip state, power transmission is impossible, and the system diverges.

Furthermore, if a slip state that is on the border of 1. above is defined as the frictional transmission limit, the current slip state can be expressed by a traction ratio that is obtained from the amplitude ratio m and the phase lag $\phi_{p.DN}$. Due to the traction ratio being used, the margin of the current slip state with respect to the frictional transmission limit can be determined, and the frictional transmission limit can be predicted.

Controlling the pulley thrust so that the slip state between the pulley and the metal belt does not attain a macro slip state not only enables the pulley thrust to be minimized and the metal belt to be prevented from slipping while enhancing the power transmission efficiency, but also enables damage to the belt type continuously variable transmission to be prevented by promptly increasing the pulley thrust in the event of the slip state attaining a macro slip state.

In order to make the slip state between the pulley and the metal belt closer to the frictional drive limit so as to enhance the power transmission efficiency, the pulley thrust may be controlled so that the imaginary part of the eigenvalue of the slip state matrix {A} gradually approaches 0, that is, the eigenvalue of the slip state matrix {A} is a real root.

Furthermore, since when the traction ratio, which is an index of the arrangement of the eigenvalues of the slip state matrix {A}, becomes 1, the slip state of the metal belt attains the frictional drive limit, and when the traction ratio is sufficiently greater than 1, the slip state of the metal belt attains macro slip, it is possible to appropriately control the pulley thrust by controlling it so that the traction ratio coincides with a predetermined target traction ratio.

Since the traction ratio expresses the resistance to slip with respect to disturbance with the frictional transmission limit as a reference, even when the coefficient of friction changes due to a change over time such as wear of the contact face between the pulley and the metal belt or deterioration of hydraulic oil, carrying out control so that the traction ratio is constant enables stability toward disturbance to be automatically ensured, and it is possible to prevent the metal belt from slipping due to disturbance while minimizing the pulley thrust. Here, setting the target traction ratio in advance so that it is less than 1 can further reliably prevent the metal belt from slipping due to unexpected disturbance.

As examples of the disturbance, there are pulsation in the oil pressure, which generates pulley thrust, a torque that is transmitted back from the driven wheel side due to the grip of the driven wheel rapidly recovering when getting away from a snow-covered road or a frozen road, a torque that is transmitted back from the driven wheel side due to an impact suffered by the driven wheel when traveling on an uneven road surface, and a torque that is transmitted to the input shaft due to misfiring of the engine.

Furthermore, unknown quantities included in the slip state matrix {A} and the traction ratio $\zeta_c^{<\ >}/\zeta_{DN}^{<\ >}$ are the amplitude ratio m and phase lag $\phi_{p.DN}$ of rotational variation between the input shaft and the output shaft and the belt pitch radius $R_{DN}$ of the driven pulley; since as described above the amplitude ratio m and the phase lag $\phi_{p.DN}$ can be calculated from the input shaft rotational speed and the output shaft rotational speed, the belt pitch radius $R_{DN}$ of the driven pulley can be determined from the gear ratio i, and the gear ratio i can be calculated from the input shaft rotational speed and the output shaft rotational speed, it is possible to calculate the slip state matrix {A} and the traction ratio $\zeta_c^{<\ >}/\zeta_{DN}^{<\ >}$ using outputs from the input shaft rotational speed sensor and the output shaft rotational speed sensor without requiring a special sensor.

The metal belt of the belt type continuously variable transmission is formed by supporting a large number of metal elements on two metal rings, and the metal ring is formed by layering a plurality of thin endless band-shaped single rings. When one of the plurality of single rings among the metal ring breaks during operation of the belt type continuously variable transmission, since there is a possibility that the remaining single rings will break one after another to thus cause a problem in power transmission, it is necessary to detect the breakage of a single ring at an early stage.

In the present embodiment, attention is focused on the fact that when one of the plurality of single rings of the metal ring breaks, the stiffness of the entire metal ring decreases by an amount corresponding thereto, and the metal belt is protected by detecting breakage of a single ring using the electronic control unit U. The method is explained below.

From Formula (13) and the definition of $\omega_{DN}$ in Formula (6), the following is obtained.

[Eq. 25]

$$\omega_{DN}(m, \phi_{p.DN}) = \frac{\Omega}{\rho}\sqrt{\frac{1+\rho^2}{1-\frac{\cos\phi_{p.DN}}{m}}} \qquad (23)$$

$$= R_{DN}\sqrt{k/I_{p.DN}}$$

When Formula (23) is solved with respect to the compression stiffness k of the metal belt, the following is obtained.

[Eq. 26]

$$k = \frac{I_{p.DN}\Omega^2(1+\rho^2)}{R_{DN}^2\rho^2\left(1-\frac{\cos\phi_{p.DN}}{m}\right)} \qquad (24)$$

The compression stiffness k of the metal belt contains the amplitude ratio m, the phase lag $\phi_{p.DN}$, and the belt pitch radius $R_{DN}$ of the driven pulley as unknown quantities, but as described above since these unknown quantities can be calculated from the input shaft rotational speed and the output shaft rotational speed, a special sensor is unnecessary.

Therefore, the compression stiffness k of the metal belt given by Formula (24) and a learned value of the compression stiffness of a normal (unbroken) metal belt that has been learned in advance are compared, and when learned value−compression stiffness>threshold value is satisfied, it can be reliably determined at an early stage if any of the single rings forming the metal ring has broken.

In the present embodiment, since the compression stiffness k of the metal belt depends on an inter-metal element pushing force E1 and a metal ring tension T1, determining whether the single ring has broken using a value E1/T1 obtained by normalizing the inter-metal element pushing force E1 with the metal ring tension T1 enables determination of breakage to be easily and reliably carried out even the operating conditions of the belt type continuously variable transmission variously change.

Figure 13:
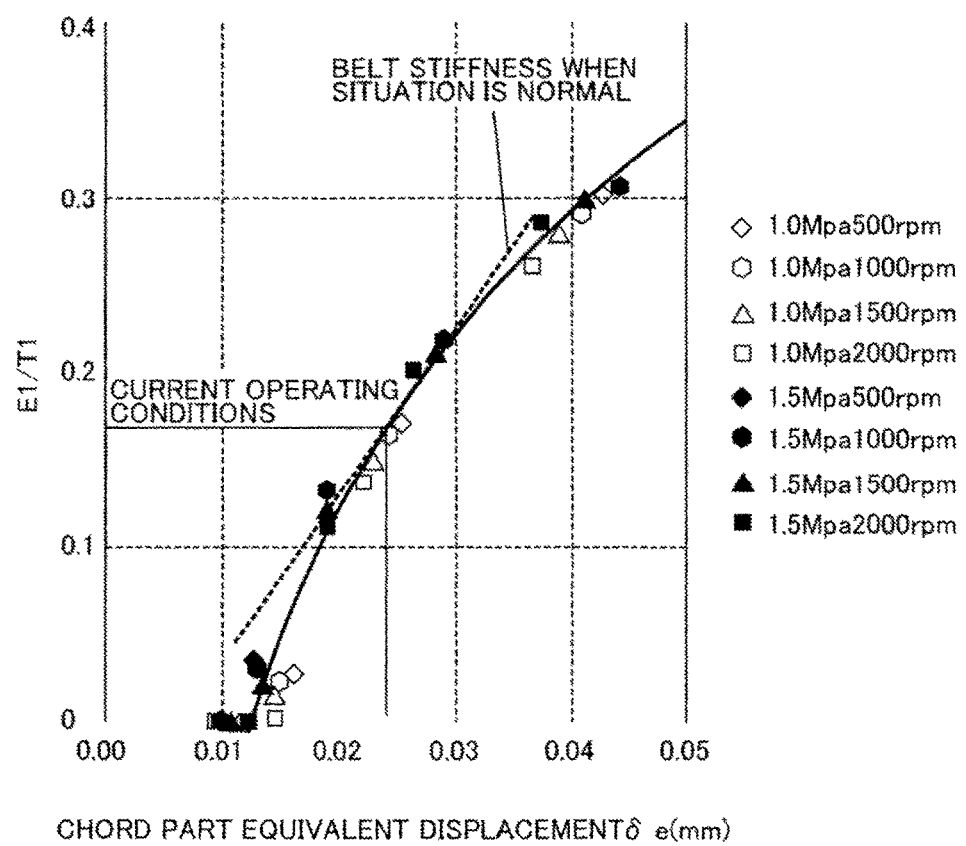
FIG. 13 is a map in which the stiffness of the metal belt is looked up using a chord equivalent displacement. (first embodiment)

FIG. 13 is a map showing the relationship between E1/T1 and the equivalent displacement of the chord part of the metal belt. The arc-shaped solid line is the actual value obtained under various operating conditions in which the pulley thrust and the pulley rotational speed are changed, and the linear broken line is an approximation to the arc-shaped solid line and is stored in advance as a learned value showing the relationship between E1/T1 and the equivalent displacement of the chord part of the metal belt. Comparing the E1/T1 obtained by conversion of the compression stiffness k of the metal belt given by Formula (24) with the learned value obtained by looking up the map makes it possible to determine whether a single ring of the metal ring has broken.

In this way, when it is determined that a single ring of the metal ring has broken, the electronic control unit U limits the degree of opening of the throttle of the engine, limits the vehicle speed, or limits the pulley thrust to thus suppress the load on the metal ring, and further switches on a warning lamp to thus issue an alarm to a driver, thereby making it possible to limp home to a repair shop while preventing breakage of the metal ring from worsening.

An embodiment of the present invention is explained above, but the present invention may be modified in a variety of ways as long as the modifications do not depart from the spirit and scope thereof.

For example, in the embodiment the belt type continuously variable transmission TM having the metal belt 15 is explained, but the continuously variable transmission of the present invention may be a chain belt type continuously variable transmission or a toroidal continuously variable transmission. In the case of a toroidal continuously variable transmission, an input disk provided on an input shaft corresponds to the input shaft element of the present invention, an output disk provided on an output shaft corresponds to the output shaft element of the present invention, a power roller held between the input disk and the output disk and transmitting driving force corresponds to the power transmission element of the present invention, and a pressure that holds the power roller between the input disk and output disk corresponds to the compression of the present invention.

The invention claimed is:

1. A compression control device for a continuously variable transmission, comprising:
    an input shaft into which a driving force of a drive source is inputted,
    an input shaft element that is provided on the input shaft,
    an output shaft via which the driving force of the drive source is changed in speed and outputted,
    an output shaft element that is provided on the output shaft,
    a power transmission element that is in contact with each of the input and output shaft elements and transmits the driving force from the input shaft to the output shaft by virtue of friction in contacted portions thereof, and
    a compression controller that controls a compression of either one of the shaft elements of the input and output shaft elements,
    wherein the compression controller calculates a slip state matrix from an amplitude ratio between a variable component of a rotational speed of the input shaft and a variable component of a rotational speed of the output shaft, a phase lag that is an indicator of difference in phase between the variable component of the rotational speed of the input shaft and the variable component of the rotational speed of the output shaft, and a gear ratio between the input shaft and the output shaft, estimates a power transmission state among the input shaft element, the output shaft element, and the power transmission element based on an eigenvalue calculated from the slip state matrix, and controls the compression based on the power transmission state.

2. The compression control device for the continuously variable transmission according to claim 1, wherein the compression controller decreases the compression so that an imaginary part of the eigenvalue of the slip state matrix is made to gradually approach 0, and increases the compression when even one eigenvalue whose absolute value exceeds 1 is present among a plurality of eigenvalues calculated from the slip state matrix.

3. A compression control device for a continuously variable transmission, comprising:
    an input shaft into which a driving force of a drive source is inputted,
    an input shaft element that is provided on the input shaft,
    an output shaft via which the driving force of the drive source is changed in speed and outputted,
    an output shaft element that is provided on the output shaft,
    a power transmission element that is in contact with each of the input and output shaft elements and transmits the driving force from the input shaft to the output shaft by virtue of friction in contacted portions thereof, and
    a compression controller that controls a compression of either one of the shaft elements of the input and output shaft elements,
    wherein the compression controller calculates a traction ratio from an amplitude ratio between a variable component of a rotational speed of the input shaft and a variable component of a rotational speed of the output shaft, a phase lag that is an indicator of difference in phase between the variable component of the rotational speed of the input shaft and the variable component of the rotational speed of the output shaft, and a gear ratio between the input shaft and the output shaft, and controls the compression so that the traction ratio coincides with a target traction ratio.

4. The compression control device for the continuously variable transmission according to claim 3, wherein the target traction ratio is less than 1.

* * * * *